N. H. DAVIS.
METAL CUTTING AND BENDING MACHINE.
APPLICATION FILED FEB. 6, 1914.

1,102,327.

Patented July 7, 1914.
8 SHEETS—SHEET 1.

FIG. 1.

WITNESSES

INVENTOR
Nathan H. Davis

BY

ATTORNEY

N. H. DAVIS.
METAL CUTTING AND BENDING MACHINE.
APPLICATION FILED FEB. 6, 1914.

1,102,327.

Patented July 7, 1914.

N. H. DAVIS.
METAL CUTTING AND BENDING MACHINE.
APPLICATION FILED FEB. 6, 1914.

1,102,327.

Patented July 7, 1914.
8 SHEETS—SHEET 8.

INVENTOR
Nathan H. Davis
George Cook
ATTORNEY

WITNESSES
Daniel Webster Jr.
George E. Cook

UNITED STATES PATENT OFFICE.

NATHAN H. DAVIS, OF PHILADELPHIA, PENNSYLVANIA, ASSIGNOR TO AMERICAN BRAKE SHOE & FOUNDRY COMPANY, OF JERSEY CITY, NEW JERSEY, A CORPORATION OF NEW JERSEY.

METAL CUTTING AND BENDING MACHINE.

1,102,327.  Specification of Letters Patent.  Patented July 7, 1914.

Application filed February 6, 1914. Serial No. 816,942.

*To all whom it may concern:*

Be it known that I, NATHAN H. DAVIS, a citizen of the United States of America, residing in the city and county of Philadelphia, in the State of Pennsylvania, have invented certain new and useful Improvements in Metal Cutting and Bending Machines, of which the following is a true and exact description, reference being had to the accompanying drawings, which form a part thereof.

The primary object of the present invention is to provide an efficient and satisfactory automatic machine for the economical manufacture of articles out of metal bars by cutting and bending operations, and particularly for the manufacture out of steel bars of reinforcing backings for cast brake shoes.

The invention consists in part in features pertaining to the general organization of the machine disclosed and in part in certain combinations and sub-combinations pertaining to individual components of the complete machine.

The various features of novelty which characterize my invention are pointed out with particularity in the claims annexed to and forming a part of this specification.

For a better understanding of the invention, however, and of the advantages possessed by it, reference should be had to the accompanying drawings and descriptive matter, in which I have illustrated and described a preferred embodiment of the invention.

Of the drawings: Fig. 4 is a somewhat diagrammatic representation of the means for advancing, slitting and severing the blank material; Fig. 5 is a view taken similarly to Fig. 4 and showing on a larger scale a portion only of the apparatus shown in Fig. 4; Fig. 6 is a plan view of a portion of the apparatus shown in Fig. 4; Fig. 7 is a partial end elevation of the apparatus shown in Fig. 4. Fig. 8 is a partial section taken on the line 8—8 of Fig. 7; Fig. 9 is a section taken on the line 9—9 of Fig. 4; Fig. 9$^a$ is a section taken on the line 9$^a$—9$^a$ of Fig. 5; Fig. 10 is a section taken on the line 10—10 of Fig. 4; Fig. 20 is an elevation partly in section taken at right angles to Fig. 19; Fig. 20$^a$ is a perspective view of a portion of one of the bending jaws employed in the mechanism of Figs. 19 and 20.

The backing, which the machine disclosed and claimed herein is primarily devised to make, is formed from a bar-like blank with bifurcated ends, by bending and twisting operations which result in curving the bifurcations at each end of the blank and setting these bifurcations into the positions in which they practically form arcs of the same circle and extend in opposite directions from the central unbifurcated blank portion which extends parallel to the axis of said circle and is connected to the curved ends of the bifurcations by twisted portions of said bifurcations.

The complete machine, in the preferred form illustrated, comprises means for slitting and severing the blanks from the bar material out of which they are made, feeding the blanks to, and securing them on the work carrier (which, in the preferred construction illustrated, is a disk) with the bifurcated ends of the blank projecting at opposite sides of the carrier, and then advancing the carrier to bring each blank successively into engagement with forming and shaping devices which operate to set the bifurcated ends of the blank transverse to the plane of the central portion of the blank, to twist the portions of the bifurcations immediately adjacent the central portion of the blank, to oppositely bend each pair of bifurcations into substantial alinement with each other, and finally to curve the bifurcations, these steps being preferably carried out in the order named.

The general mode of operation of the machine shown by the drawings is as follows: The blank feeding mechanism, collectively indicated by the symbol A, intermittently advances the blank forming bar X in the direction of its length a distance equal to the length of an individual blank X' to the slitting and severing mechanism, collectively indicated by the symbol B. This mechanism comprises slitting blades which form a longitudinal slit $X^{10}$ (see Fig. 6) in the blank bar X of a length slightly less than that of an individual blank X', and severing blades which sever the blank material along the lines $X^{11}$ midway between the ends of the longitudinal slit $X^{10}$ into the individual blanks X'. Each blank X' thus comprises bifurcated end portions and an intermediate unslitted central portion which forms the "loop" or back of the securing eye of the brake shoe in which the finished reinforcing piece formed out of each blank is eventually incorporated. From the slitting and severing mechanism the blanks X' are successively advanced into position to be engaged by the traveling work carrier wheel D, which, in the form shown, is provided at its periphery with a series of work holding seats against each of which, while in the work receiving position, a blank is secured with its bifurcated ends projecting at opposite sides of the wheel. The blank material and, after its severance, the severed blanks are advanced from the feeding mechanism A to the wheel D through a conduit formed of sections C and CA which are cut away and made flexible as and for the purposes hereinafter explained. The work carrying wheel D is intermittently rotated to carry each blank secured to it step by step through the zones of operation of shaping devices indicated collectively by the reference symbols E, F, G and H, and finally into the range of action of the work discharging mechanism I.

Figures 21, 22, 23, 24, 25, 26:
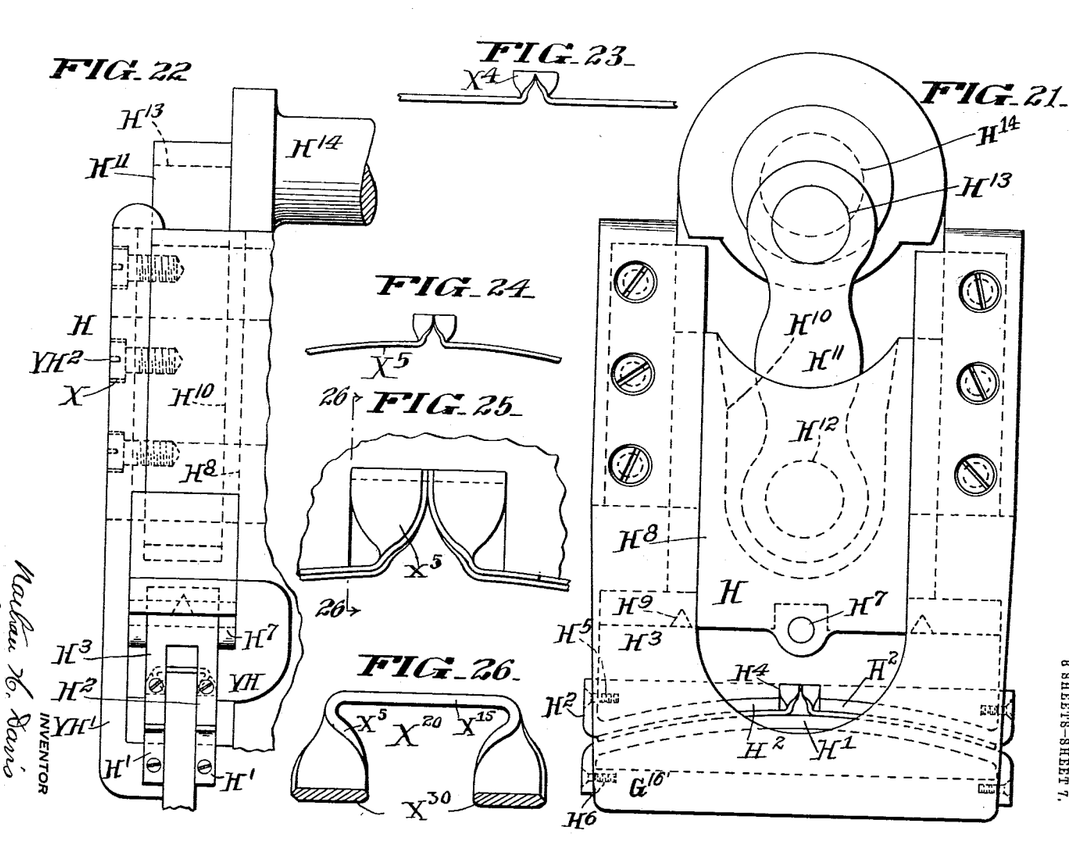
Fig. 21 is an elevation taken parallel to Fig. 1, illustrating a portion of the mechanism for performing the fourth and final bending operation on the blank.
Fig. 22 is a view of the apparatus shown in Fig. 21, taken at right angles to that figure.
Fig. 23 is a view of the blank in the condition in which it passes from the mechanism of Figs. 19 and 20 to the mechanism of Figs. 21 and 22.
Fig. 24 is a side elevation of the finished blank into which the blank of Fig. 23 is converted by the mechanism of Figs. 21 and 22.
Fig. 25 is a view of a portion of the blank taken similarly to Fig. 24, but on a larger scale.
Fig. 26 is a section on the line 26—26 of Fig. 25.

The blank formed by the machine is shown in Figs. 24, 25 and 26 and is of the construction disclosed and claimed in my prior Patent No. 822,352, granted June 5, 1906, and embodies also certain improvements on the patented construction which are claimed in my co-pending application Serial No. 770,812, filed May 31st, 1912.

The stationary frame work of the machine is collectively indicated by the symbol Y, and as shown the machine is driven by an electric motor J, which is secured to the frame work Y and has its shaft J' geared to a counter shaft L by gears $K'$ and $K^2$. The counter shaft L carries a gear $K^3$ which meshes with the large gear $K^4$ at the back of the machine. In mesh with the gear $K^4$ is a gear $K^5$ secured to a shaft L'. At its front end the shaft L' carries a beveled gear A' which forms the driving gear of the blank feeding mechanism. The gear A' meshes with a beveled gear $A^2$ and the latter has rigidly connected to it an intermittent gear $A^3$ which is in mesh with a second intermittent gear $A^4$ secured to the shaft of the lower feed roll $A^7$ of the blank feeding mechanism. The intermittent gears $A^3$ and $A^4$ are so arranged that each rotation of the gear $A^3$, which has the same angular velocity as the shaft L', gives the gear $A^4$ and consequently the feed roll $A^7$ a third of a revolution which is sufficient to advance the blank material X the length of an individual blank X'. Gears $A^5$ and $A^6$ secured to the shafts of the lower and upper feed rolls $A^7$ and $A^8$ cause these rolls to rotate together. In the form shown (see Fig. 4) the feed roll $A^7$ is provided with a body portion of the width of the blank material, and at the ends thereof with shrouds $A^9$ which project beyond the periphery of the body portion a distance exceeding the thickness of the blank material. The roll $A^8$ is formed with a central portion which enters between the shrouds $A^9$ of the roll $A^7$ and engages the upper side of the blank material.

The slitting and severing mechanism B comprises a stationary crosshead B' carried by the framework posts Y'. The crosshead B' has affixed to it the upper longitudinal slitting blade $B^2$ and the upper transverse severing blade $B^3$. Coöperating with the stationary crosshead B' is a movable crosshead $B^4$ carrying the lower longitudinal slitting blade $B^5$ and the lower transverse severing blade $B^6$. The crosshead $B^4$ is guided in its movements by the frame post Y'. The crosshead $B^4$ is provided with a longitudinally extending channel $B^7$ in its underside shaped to receive the rounded bead-like upper edge of a member $B^8$. The latter comprises leg portions $B^9$ in the lower ends of which are formed semi-cylindrical bearing surfaces which rest upon cams $B^{10}$ carried by the shaft L'. In consequence the crosshead $B^4$ is given one rising and falling movement for each rotation of the shaft L'. It will be understood that the gears $A^3$ and $A^4$ and the cams $B^{10}$ are so relatively arranged that the blank material is advanced while the crosshead $B^4$ is in a lower position in which the opposing slitting blades and severing blades are separated by a distance greater than the thickness of the blank. The slitting blades $B^2$ and $B^5$ have wedge shaped cutting edges which meet in the center of the blank.

The conduit section C extends between the feed rolls $A^7$ and $A^8$ and the severing blades $B^3$ and $B^6$ and is secured at one end to the bracket CY carried by the post Y' adjacent the feed rolls $A^7$ and $A^8$. The conduit section C, as well as the section CA is made flexible as by laminating it.

Figure 1:
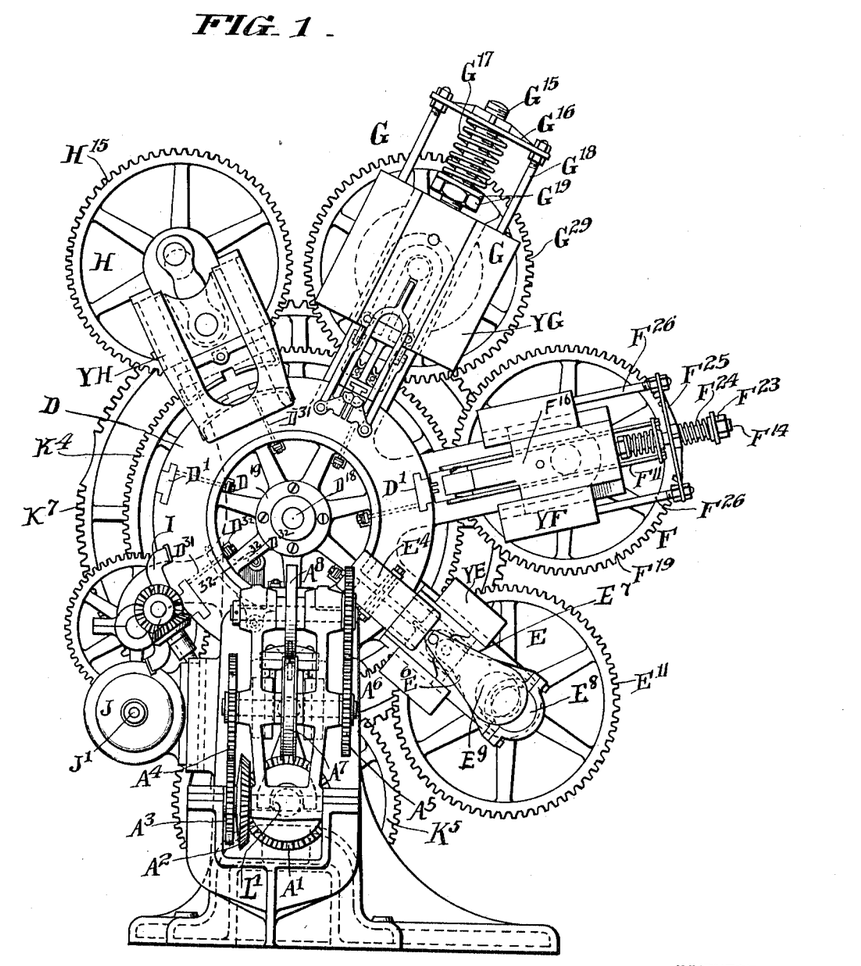
Figure 1 is a front elevation of the complete machine.
Figures 2, 3:
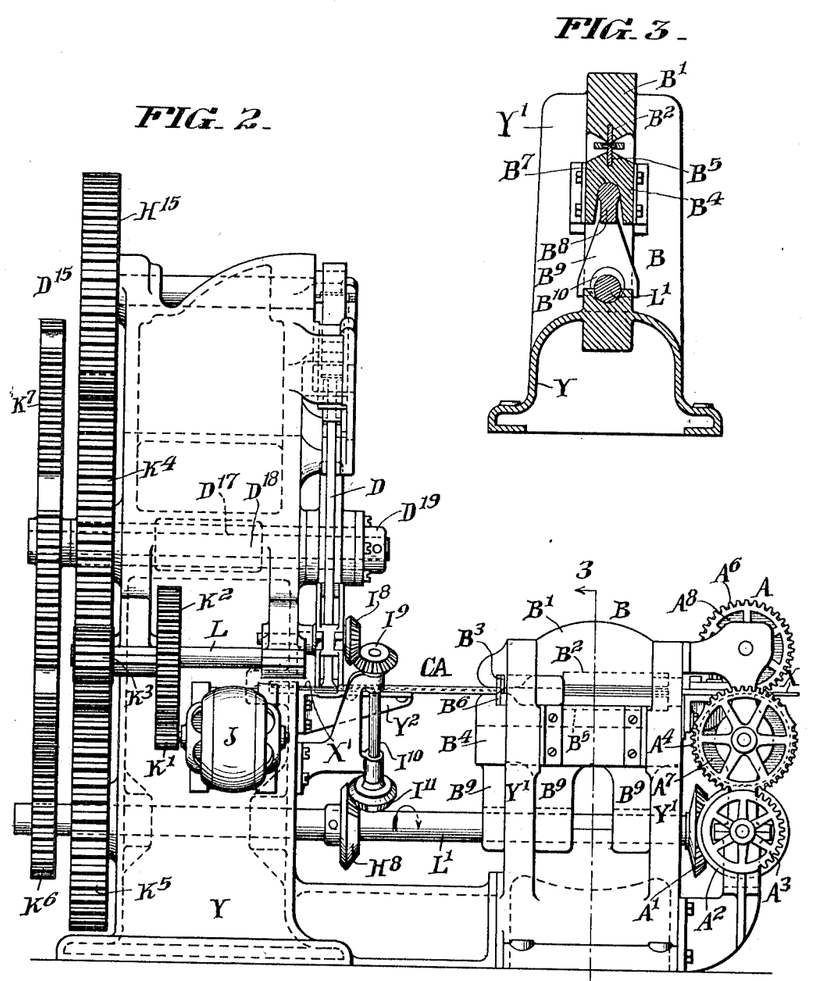
Fig. 2 is a side elevation, taken at right angles to Fig. 1.
Fig. 3 is a section on the line 3—3 of Fig. 2.
Figures 4, 5, 6, 7, 8, 9, 9A, 10:
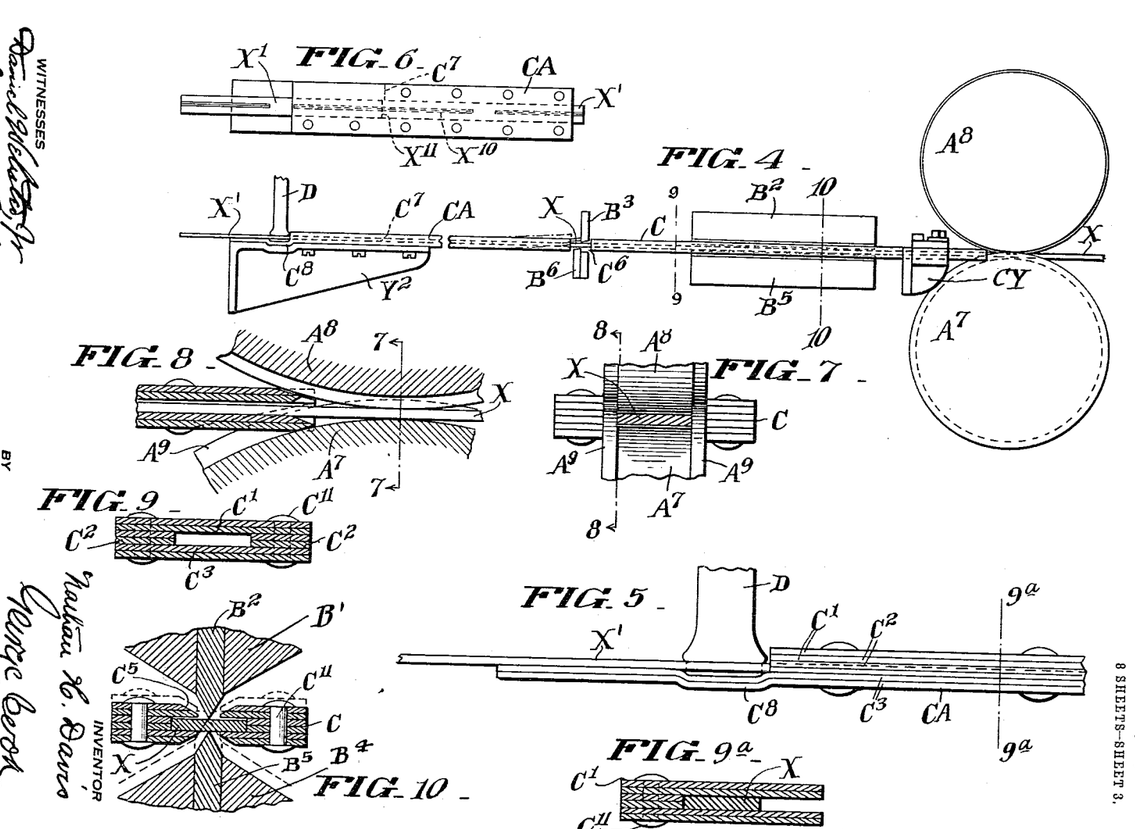

As shown in Fig. 9, C' represents the laminæ forming the top; $C^3$ the laminæ forming the bottom; and $C^2$ the laminæ forming the sides of the blank channel in the conduit sections. It is apparent that the portion of the blank gripped between the feed rolls $A^7$ and $A^8$ and the portion engaged by the severing blade $B^3$ are not free to share in the rising movement of the portion of the blank operated on by the blades $B^2$ and $B^5$ necessary to permit these blades to meet in the center of the blank. The blank material, however, is of a character readily permitting of the necessary bending for this purpose, and this in conjunction with the flexibility of the conduit section and the fact that the blank channel of the conduit is preferably, as shown, of appreciably greater depth than the thickness of the blank material, permits the slitting operation and severing operation to be properly carried out. The conduit section C is cut away at its receiving end, as indicated in Fig. 8, to conform to the contour of the feed rolls $A^7$ and $A^8$. The laminæ C' and $C^3$ of the conduit section C are cut away as indicated in Fig. 10, to accommodate the slitting blades $B^2$ and $B^5$.

The conduit section CA extends from the severing blades $B^3$ and $B^6$ to the work wheel D. The end of the section CA adjacent the blades $B^3$ and $B^6$ is free, but at the other end the section is secured by means of suitable bolts to a bracket $Y^2$ secured to the stationary frame work Y of the machine. The laminæ C' of the section CA terminate short of the work wheel D, as shown best in Fig. 5, and the portion of the laminæ $C^2$ at one side of the blank channel is cut away at the side of the line $C^7$ adjacent the work wheel to permit the blanks to be laterally moved out of the conduit by the work wheel D, when secured to the latter. To clear the blank clamping devices of the work wheel D the laminæ $C^2$ are given a bend beneath the work wheel as indicated at $C^8$ in Figs. 4 and 5.

The work wheel D is in the form of a disk provided at its periphery in the particular construction illustrated, with seven equally spaced apart work holding seats. At each of these seats there is a removable body block D' which is received in a suitable undercut recess formed in the periphery of the work wheel, and is secured in place by the bolts $D^2$. Each block D' has dovetailed to it a removable work engaging part $D^3$. The part $D^3$ is of a width at its outer face equal to the maximum width of the eye $X^{20}$ of the finished backing (see Fig. 26), whereas the thickness of the block D' and the peripheral portion of the wheel is equal to the distance between the adjacent edges of the longitudinal legs $X^{30}$ of the finished backing. The sides of the part $D^3$ are incurved to conform to the sides of the eye $X^{20}$. The parts $D^3$ are each formed with a flat outer surface or seat $D^4$ on which the unslitted portion $X^{15}$ of the blank bears and with an undercut projection $D^5$ at one end of this seat which bears against one edge of the blank. Each work seat block D' is formed with a cavity in which is located a locking dog $D^7$ pivoted on the bolt $D^8$. The blank engaging each seat $D^4$ is clamped between the corresponding projection $D^5$ and locking dog $D^7$. Each dog $D^7$ is provided with a shoulder $D^{10}$ engaging a follower $D^{11}$ which has an extension $D^{12}$ axially received in a helical spring $D^{13}$ and projecting into the spring cavity $D^{14}$ formed in the block D'. The spring $D^{13}$ exerts the desired clamping force. The dog $D^7$ is formed with a detent or shoulder $D^{20}$ engaged by a hook $D^{30}$ carried at the outer end of an operating rod $D^{31}$. The latter is actuated through the lever $D^{32}$ and bolt $D^{33}$ and cam $Y^{21}$ carried by the stationary frame work of the machine to move the work engaging end $D^9$ of the dog $D^7$ away from the shoulder $D^5$ thus freeing the work as the corresponding work holding seat is moved into the work discharging position. Each dog $D^7$ thus retracted is held in its retracted position until the corresponding work holding seat is moved through the blank receiving position.

The work holding wheel D is journaled on the front end of a stationary hollow shaft $D^{17}$. Within the hollow shaft $D^{17}$ is mounted the revoluble shaft $D^{18}$ which has secured to it at its front end a cap member $D^{19}$ which is secured also to the work holder D. The means shown for giving the work holder D its necessary intermittent angular movements comprise a large intermittent gear $K^7$ secured to the rear end of the shaft $D^{18}$ and driven by the intermittent gear $K^6$ carried by the shaft L', the arrangement being such that the gear $K^7$ is intermittently advanced one-seventh of a revolution during a portion of each revolution of the shaft L' and is then held stationary until the shaft L' completes its revolution. It is to be observed that the large gear wheel $K^4$ is journaled on the rear end of the stationary hollow shaft $D^{17}$.

Each blank X', after being secured in place against the corresponding block D' of the work wheel is advanced first from the receiving position into the position to be operated upon by the twisting or initial bending mechanism which sets the bifurcated ends of the blank in planes at right angles to the plane of the body of the blank.

Figures 11, 12, 13, 14, 15:
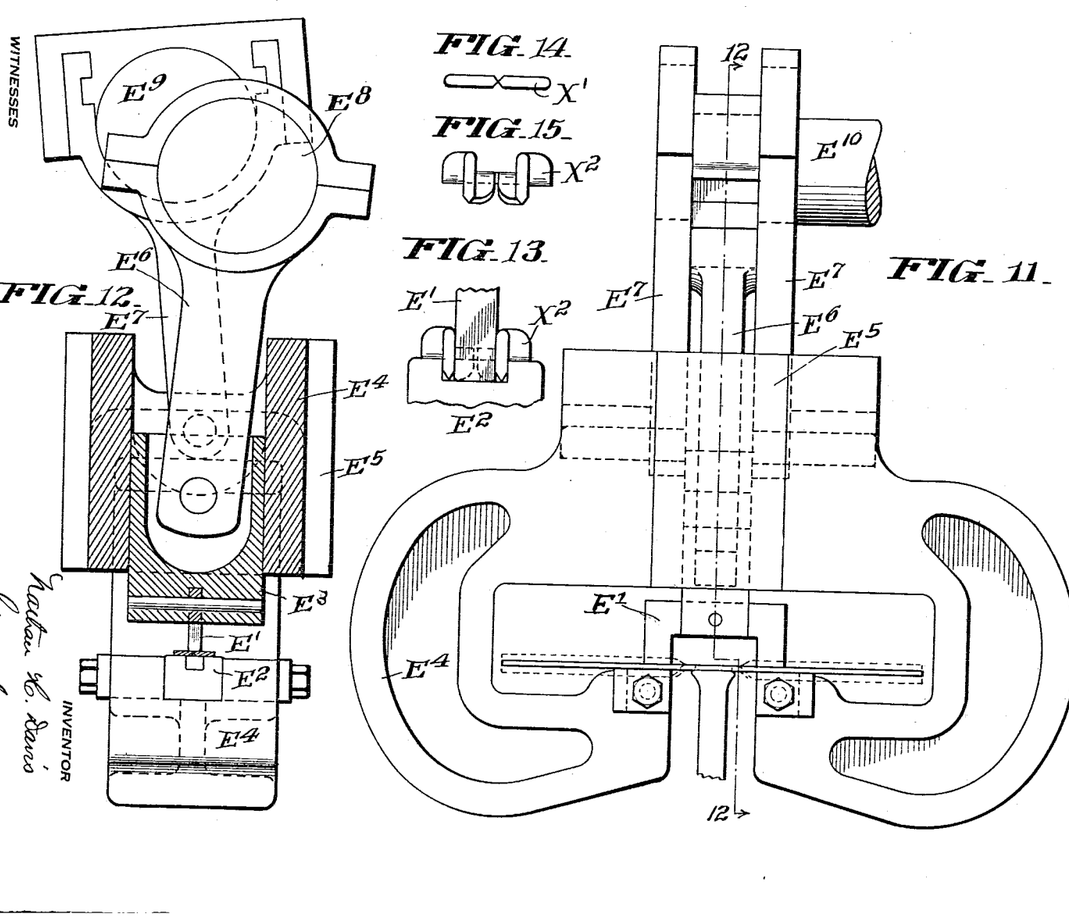
Fig. 11 is an elevation taken at right angles to Fig. 1, showing a portion of the twisting or initial bending mechanism.
Fig. 12 is an elevation partly in section on the line 12—12 of Fig. 11.
Fig. 13 is an enlarged view taken similarly to Fig. 12, showing a portion of the apparatus of that figure with parts in a different position.
Fig. 14 is an end elevation of the blank acted upon by the mechanism of Figs. 11 and 12.
Fig. 15 is an end elevation of the blank after it has been acted upon by the mechanism of Figs. 11 and 12.

Fig. 14 is an end view of the blank X' presented to this mechanism and Fig. 15 is an end view of the blank $X^2$ into which the blank X' is changed by this mechanism. The mechanism E, (see Figs. 1, 11, 12 and 13) comprises two sets of male and female dies, arranged, one set at each side of the work holder wheel. The male die E' of each set is in the form of a blade extending transverse to the work holding wheel and in a radial plane, and is of a thickness equal to one-half the width of the blank less the thickness of the blank. The cavity in each of the similar female die parts $E^2$ is of a thickness equal to the thickness of the die part E' plus twice the thickness of the blank. In operation, each die is moved toward the blank until each male die E' is entered in the corresponding female die $E^2$ and the bifurcations are twisted about their medial lines, as shown in Fig. 13.

The die parts E' are carried by a crosshead $E^3$ and the die parts $E^2$ are carried by a crosshead $E^4$. The crosshead $E^3$ is slidingly mounted in the crosshead $E^4$ for its movements relative thereto. The crosshead $E^4$ is provided with guide ribs $E^5$ which enter slideways formed in corresponding portions YE of the stationary frame work. The crossheads $E^3$ and $E^4$ are given their properly timed movements through connecting rods $E^6$ and $E^7$, respectively, and coöperating eccentrics $E^8$ and $E^9$ carried by the operating shaft $E^{10}$ of the mechanism E. This shaft is journaled in the stationary frame work of the machine and carries at the one end, the driving gear $E^{11}$ which meshes with the large gear $K^4$ already referred to.

Figures 16, 17, 18:
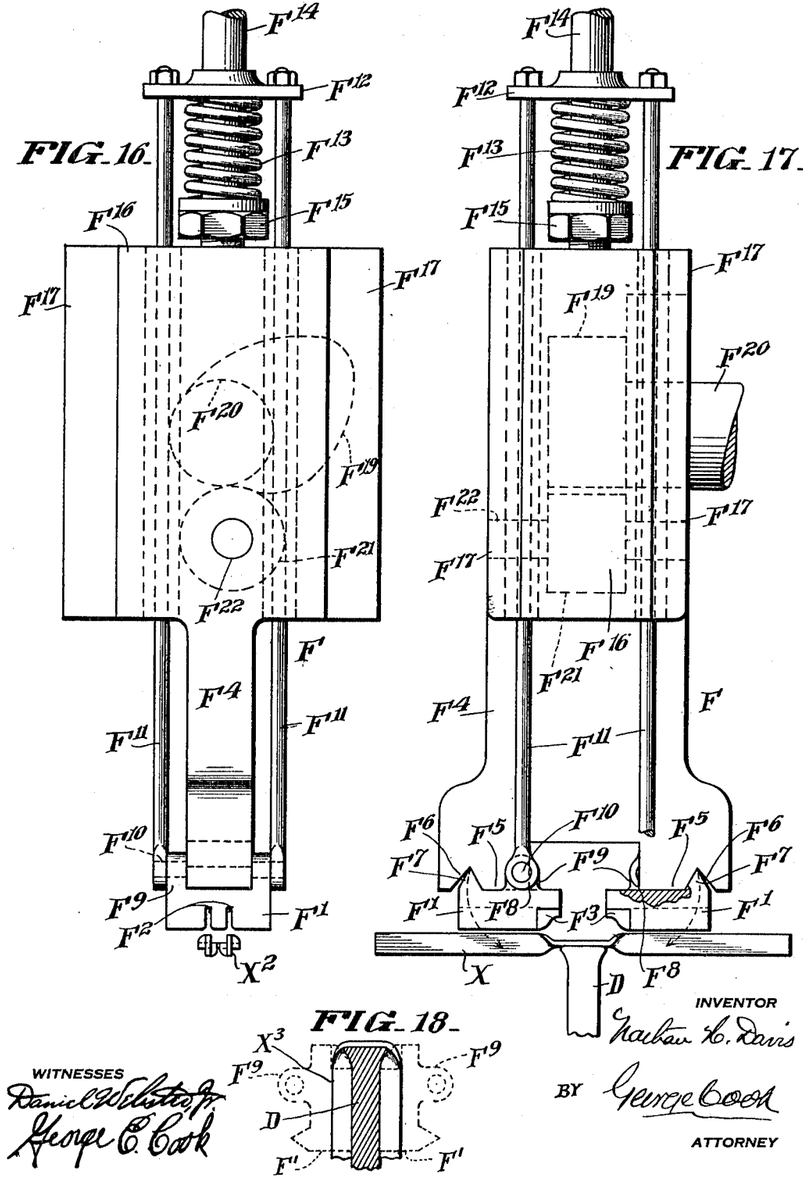
Fig. 16 is an elevation taken parallel to Fig. 1 showing a portion of the second bending mechanism.
Fig. 17 is a view of the apparatus shown in Fig. 16, taken at right angles to the latter.
Fig. 18 is a view illustrating the condition of the blank after being operated upon by the mechanism of Figs. 16 and 17.

After being subjected to the operation of the mechanism E the blank $X^2$ is advanced into position to be engaged by the mechanism F (see Figs. 1, 16, 17 and 18). The function of this mechanism is to bend the bifurcations of the blank inward against the sides of the work wheel D and convert the blank $X^2$ into the blank $X^3$ of Fig. 18. This is accomplished in the mechanism F by means of bending dies F' arranged one on each side of the work wheel and formed each with two slots $F^2$ receiving the corresponding bifurcations of the blank. The dies F' are cut away at $F^3$ to accommodate the twisted portions of the blank bifurcations. The dies F are mounted on a movable crosshead $F^4$ but are not rigidly secured thereto. As shown the crosshead $F^4$ is provided at its end adjacent the work wheel with faces $F^5$ against which the backs of the dies F' normally bear. This end of the crosshead is also formed with V-shaped notches $F^6$ receiving wedge-shaped centering projections $F^7$ formed on the back of the dies F'. When the crosshead $F^4$ is moved toward the center of the work wheel D or downward, as seen in Fig. 17, the blank bifurcations are received in the slots $F^2$ and the dies F' tilt, as the bifurcations begin to bend, about the fulcrum edges $F^8$ of the crosshead, until finally the slots $F^2$ in the dies F' extend radially of the work holder as shown in dotted lines in Fig. 18. The dies F' are normally held in the position relative to the crosshead shown in Fig. 17 by rods $F^{11}$ pivoted at $F^{10}$ to ears $F^9$, formed on the outer sides of the dies F'. The rods $F^{11}$ are connected at their upper end to a crosshead $F^{12}$. Between the latter and an adjustable abutment formed by a washer and supporting nut $F^{15}$ on a bolt $F^{14}$ secured to the crosshead $F^4$, extends a helical spring $F^{13}$. This spring tends to hold the dies F' in, and to return them to their normal position shown in Fig. 17.

The crosshead $F^4$ is provided with a body portion $F^{16}$ formed with guide ribs $F^{17}$ received in suitable guideways formed in the stationary frame work portion YF. A cam $F^{19}$ carried by the rotating shaft $F^{20}$ gives the crosshead $F^4$ its movement in the bending or inward direction. The cam $F^{19}$ directly engages for this purpose an anti-friction roll $F^{21}$ journaled in the crosshead at $F^{22}$. To move the crosshead outward to clear the work wheel after the completion of each bending operation the rod $F^{14}$ is provided at its outer end with a nut $F^{23}$ against which bears one end of a helical spring $F^{24}$ surrounding the rod and bearing at its inner end against the stationary crosshead $F^{25}$. The latter is carried by bolts $F^{26}$ secured at their inner ends to the stationary portions YF of the framework of the machine.

From the bending mechanism F, each blank $X^3$ is advanced into the position to be operated on by the mechanism G, the function of which is to set the two bifurcations of the blank at the same side of the work wheel into substantial alinement with each other, thus converting the blank $X^3$ of Fig. 18 into the blank $X^4$ of Fig. 23. The mechanism G comprises four dies $G'$, arranged two on each side of the work wheel and one for each bifurcation of the blank. The dies $G'$ each comprise a triangular body portion parallel to the plane of the work wheel and formed with a bifurcation receiving slot $G^3$ in its side adjacent the work wheel. Each die $G'$ is provided at the side away from the work wheel with an elongated cylindrical portion $G^2$. The cylindrical portions $G^2$ of the two dies $G'$ at each side of the work wheel are journaled in die holders $G^3$ slidingly mounted in the stationary framework $YG'$, to move toward and away from the work wheel D. The dies $G'$ are rotated with respect to the die holders $G^3$ by means of links $G^5$ pivotally connected to the dies $G'$ at $G^4$ and pivotally connected also to intermediate links $G^6$ which are pivotally connected in turn to the links $G^7$. The latter are pivotally connected to the movable crosshead $G^9$ at $G^8$. This plurality of links is provided to permit the dies $G'$ to move axially and angularly with respect to the crosshead $G^9$. The latter is formed with guides $G^{10}$ which are slidingly received in guideways formed in the stationary framework portions YG. The crosshead $G^9$ is moved in the inward or bending direction by means of a cam $G^{11}$ carried by the driving shaft $G^{12}$ which also carries a driving gear $G^{20}$ meshing with the gear $K^4$. The periphery of the cam $G^{11}$ bears against an anti-friction roll $G^{13}$ journaled on the shaft $G^{14}$ carried by the cross head $G^9$. The crosshead $G^9$ is moved outward by means of a spring $G^{17}$ which surrounds a rod $G^{15}$ secured to the crosshead $G^9$. The spring $G^{17}$ bears at one end against the crosshead abutment formed by the nuts $G^{19}$, and at the other end against a stationary crosshead $G^{16}$ carried by the bolts $G^{18}$ secured at their inner ends to the frame portion YG.

The dies $G'$ are moved toward and away from the wheel D by means of levers $G^{20}$ pivoted at $G^{21}$ to the frame work $YG'$, and provided at their outer ends with inturned portions $G^{22}$ engaging suitably disposed side cams $G^{23}$ formed on the opposite sides of the main cam $G^{11}$. The cams $G^{23}$ operate to separate the outer ends of the opposing pair of levers $G^{22}$ and the inner ends of these levers are urged apart by springs $G^{26}$ which act against lugs $G^{25}$ carried by the levers $G^{20}$ and are mounted on bolts $G^{27}$ secured to the framework $YG'$. The levers $G^{20}$ are bifurcated at their inner ends and each bifurcation is provided with a lug $G^{29}$ which enters between projections $G^{24}$ formed on the corresponding die holders $G^3$.

Figure 19:
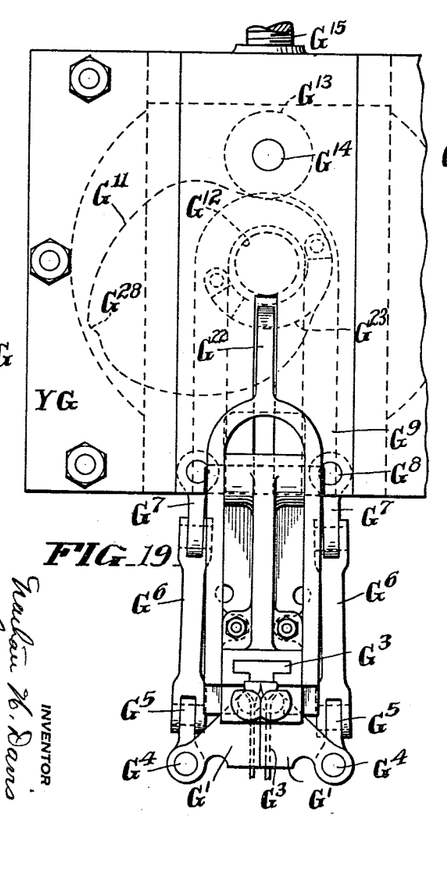
Fig. 19 is an elevation taken parallel to Fig. 1 of a portion of the mechanism for performing the third bending operation on the blank.
Figures 20, 20A:
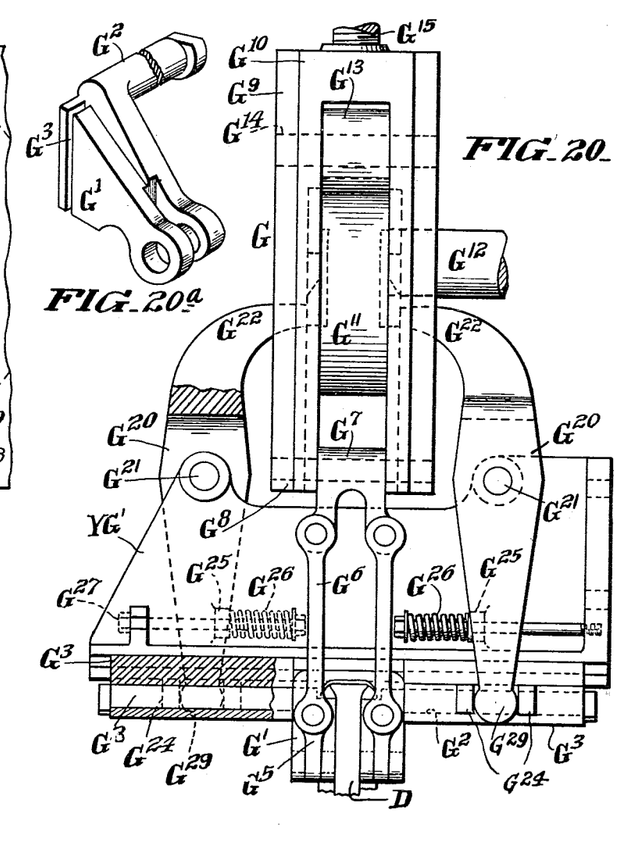

In the operation of the mechanism G, each blank $X^3$ worked upon is moved into proximity with the mechanism G while the dies $G'$ are held in their retracted position by the springs $G^{26}$. The dies are then moved axially toward the work wheel to enter the bifurcations of the blank in the slots $G^3$ of the dies. The blank worked upon and the dies then occupy the relative positions shown in Fig. 19. After the inward movement of the dies is completed, the dies are rotated about the axes of their axial extensions $G^2$ to set the two bifurcations at each side of the work wheel into alinement with each other, forming the blank $X^4$. The dies are then moved away from the work wheel and are thereafter rotated to return them to the initial position. As shown, the cam $G^{11}$ is advantageously provided with a depression $G^{28}$ so arranged with respect to the cams $G^{23}$ that the dies are given a slight backward rotation immediately prior to the beginning of their movement away from the work wheel in order to accommodate the resiliency of the blank material and to reduce the frictional resistance opposing the withdrawal of the blanks from the slots $G^3$ of the dies.

After the operation performed on each blank by the mechanism G is completed the blank is advanced into position to be engaged by the final bending mechanism H. The function of this mechanism is to convert the blank $X^4$ of Fig. 23 into the finished article $X^5$ shown in Figs. 24, 25 and 26. This is accomplished by means of a pair of lower stationary dies $H'$ arranged one on each side of the work wheel and coöperating outer movable dies $H^2$. The die $H'$ at the back of the work wheel is mounted on the stationary frame work portion YH and the other is carried by a member $YH'$ detachably connected at the front side of the work wheel to the frame work portion YH by bolts $YH^2$. The dies $H^2$ are carried by a die holder $H^3$ which is bifurcated to straddle the work wheel and has two dies $H^2$ secured to the inner end of each bifurcation, each of these dies extending from the central blank loop receiving socket $H^4$ formed in the die holder $H^3$ to the corresponding end of the die holder. Each die $H^2$ is formed with an outturned end portion through which a screw $H^5$ passes into the end of the die holder to secure the die part in place. The dies $H'$ are in the form of arc-shaped bars with inturned end portions secured to the inner die supports by screws H⁶ tapped into the ends of the die supports. The die parts H' and H² may advantageously be made out of steel bars bent into shape and consequently may be cheaply and easily renewed from time to time. The die holder H³ is removably connected at H⁷ to the movable crosshead H⁸ which is slidingly mounted in a guideway formed in and between the frame portions YH and YH'. The die holder H³ is formed on its outer side with conical projections H⁹ at each side of the connection H⁷. These conical projections enter into corresponding sockets in the crosshead H⁸ and serve as centering devices. The crosshead H⁸ is formed with a cavity H¹⁰ receiving the lower end of the connecting rod H¹¹ which is pivotally connected at its inner end to the crosshead H⁸ at H¹² and is pivotally connected at its outer end to the crank pin H¹³ carried by the operating shaft H¹⁴. The latter carries at its back end a gear H¹⁵ which meshes with the gear K⁴.

Figure 27:
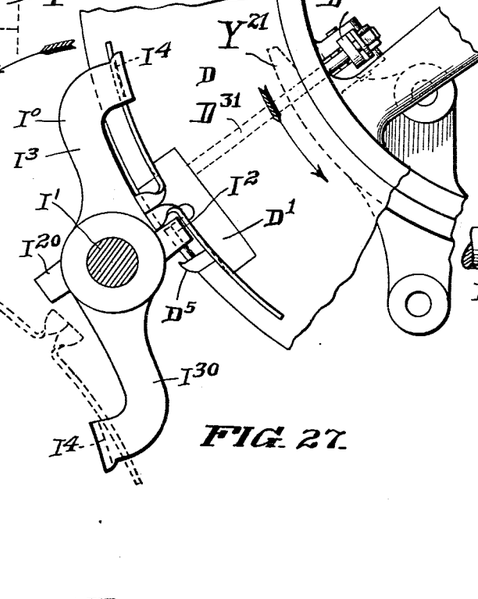
Fig. 27 is an elevation taken parallel to Fig. 1 illustrating the ejector mechanism by which the blanks are discharged from the machine.
Figures 28, 31:
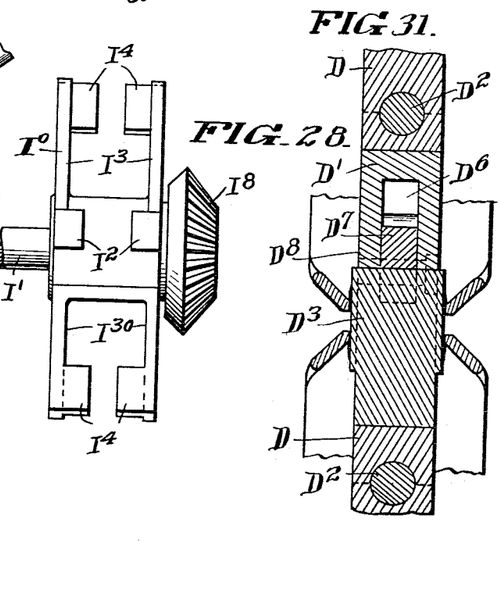
Fig. 28 is an elevation of the ejector mechanism taken at right angles to Fig. 27.
Fig. 31 is a partial section on the line 31—31 of Figs. 29 and 30.
Figure 29:
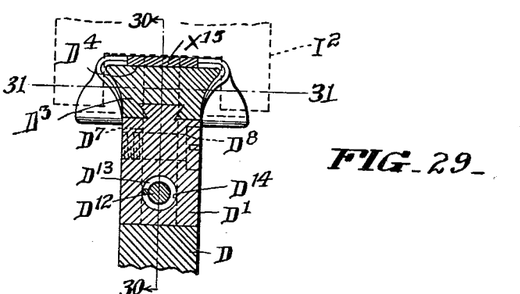
Fig. 29 is a partial section taken on the line 29—29 of Fig. 30, showing a portion of the work carrying wheel.
Figure 30:
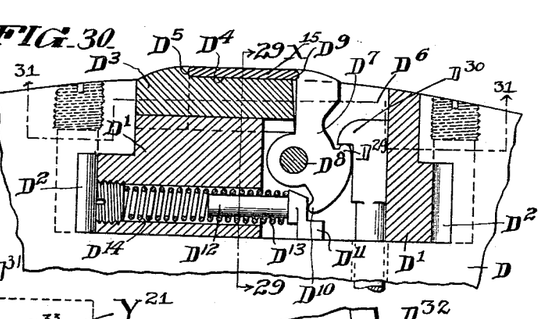
Fig. 30 is a partial section taken on the line 30—30 of Fig. 29.
Figure 32:
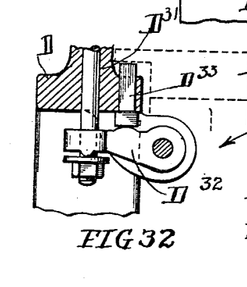
Fig. 32 is a partial section taken on the line 32—32 of Fig. 1.

After being operated upon by the final bending mechanism H, each finished backing is advanced into engagement with the work discharging mechanism I. As this occurs the dog D⁷ is retracted through hook D³⁰, rod D³¹, lever D³², rod D³³ and cam Y²¹ as already explained. The discharging mechanism (see Figs. 27 and 28) comprises an intermittently rotated device I⁰ carried by the shaft I' which is given half a turn during each work removing operation. The device I⁰ is formed with a pair of lugs or arms I² which straddle the work wheel and while clearing the projection D⁵ of each workholder presented to them engage the edges of the portions of the backing or article as indicated in Figs. 27 and 29, and stop each backing X⁵ presented to them before the work wheel stops. Coöperating with the pair of lugs or arms I² are a pair of lugs or arms I³ which normally extend parallel to the periphery of the work holder and are provided at their ends with inturned portions I⁴ which pass under the arms or bifurcations of each backing X⁵ engaged by them. As before stated, the device I⁰ makes a half turn at each ejecting operation and there are lugs or arms I²⁰ and arms I³⁰ similar to and diametrically opposed to the arms I² and I³ respectively. The shaft I' and device I⁰ are stationary during the period of travel of the workholder in which each backing X⁵ is being brought into the position relative to the discharging mechanism shown in Fig. 27. When, thereafter, the work wheel pauses, the device I⁰ is given a one-half turn. In consequence the blank then engaged by the work holder is swung away from the work wheel and falls out of the ejector as indicated in dotted lines in Fig. 27. The one-half turn of the ejector brings the second set of arms I²⁰ and I³⁰ into position to engage the next blank advanced by the work wheel. The shaft I' is driven from the shaft L' through the small shaft I¹⁰, the beveled gears I⁸ and I⁹ connecting the shafts I and I¹⁰ and the beveled gears I¹¹ and K⁸ connecting the shafts I¹⁰ and L'. The gears G¹¹ and H⁸ are intermittent gears so arranged that the shaft I' is held stationary during the greater portion of the time required for the shaft L' to make one turn and the shaft I' is then given a half turn during the remainder of the revolution of the shaft L'.

The operation of the machine as a whole will be readily apparent from the foregoing description. In practice, the blank material is fed into the machine and the various cutting and bending operations are performed on it in a cold state. The construction of the machine is one adapted to secure the strength and rigidity required for the rapid formation of backings in a simple manner without making the machine unduly heavy or expensive to manufacture. The various operations performed on the blank are carried out in a manner which does not require an excessive amount of power or subject the material worked upon to undue strains. It should be explained, however, that while the method of manipulating the blank carried out by the use of the mechanism disclosed is novel with me, this method is not claimed herein, but is claimed in my copending application, Serial No. 695,332, filed May 6th, 1912.

While in accordance with the provisions of the statutes, I have illustrated and described the best embodiment of my invention and the best mode of using it now known to me, those skilled in the art will understand that changes may be made in the form of the apparatus disclosed without departing from the spirit of my invention, and that some features of the invention may sometimes be used without a corresponding use of other features.

Having now described my invention, what I claim as new and desire to secure by Letters Patent is,

1. In a machine for converting a bar like blank having bifurcated ends and an unslitted body portion into a device in which each pair of bifurcations are parallel to the plane of the unslitted body portion and extend away from the latter in opposite directions, the combination of a revoluble blank carrier on which said blank is secured with its ends projecting at opposite sides of said blank carrier and bending and twisting dies adapted to successively engage and operate on the blank, as the latter is rotated step by step by the blank carrier, to effect such conversion in stages.

2. In a machine for converting a bar like blank having bifurcated ends and an unslitted body portion into a device in which each pair of bifurcations are parallel to the plane of the unslitted body portion and extend away from the latter in opposite directions, the combination of a traveling blank carrier on which said blank is secured with its ends projecting at opposite sides of said blank carrier and means adapted to successively engage and operate on the blank as the latter is advanced by the blank carrier to effect such conversion in stages, said means comprising dies engaging the bifurcations to give the latter each a quarter twist about its longitudinal axis, dies engaging the bifurcations and bending them into position in which they are substantially parallel to one another and perpendicular to the unslitted body portion, and dies engaging the twisted and bent bifurcations and bending them into a plane transverse to the initial direction of the blank to cause each bifurcation to extend away from the other bifurcation of the same pair.

3. In a machine of the kind described, the combination of slitting and severing mechanism for severing a bar of blank material into blanks, and for slitting the ends of each blank, a blank carrier, feeding mechanism for intermittently advancing a bar of blank material to the slitting and severing mechanism and for transferring the blanks from the latter to said blank carrier, means for securing the blanks on said blank carrier with the opposite ends of each blank projecting at opposite sides of said carrier, and mechanism for operating on each blank supported by said blank carrier to set each pair of bifurcations into substantial alinement with each other and parallel to the plane of the unslitted body portion of the blank.

4. In a machine for cutting and bending articles out of a flat metallic bar the combination of cutting blades, bending mechanism, and a blank conveying conduit extending between said mechanism and said blades and anchored at a point removed from the cutting blades and being flexible between the cutting blades and the point of anchorage to accommodate blank movements consequent upon the operation of the cutting blades, said conduit being built up of flat metallic laminæ and provided with a passage having a substantially rectangular cross section.

5. In a machine for cutting and bending articles out of metal bars, the combination of feed rolls, bending mechanism, a conduit extending between said feed rolls and said bending mechanism, said conduit being cut away to permit the operation of the blades of slitting and severing mechanism upon the material advanced through said conduit and being made flexible to accommodate the movement of the blank material in a direction transverse to the length of the conduit, produced by the operation of the slitting and severing mechanism, and said slitting and severing mechanism.

6. In a machine of the kind described, the combination of mechanism for intermittently advancing a bar of blank material, mechanism for slitting the bar at intervals in the direction of its length, mechanism for thereafter severing the bars by cuts transverse to and intersecting said slits at the point intermediate the ends of the slots whereby blanks each having bifurcated ends and an unslitted body portion are produced, a blank carrier on which said blanks are secured one after another with their ends projecting at the opposite sides of said blank carrier and mechanism for operating on each blank supported by said blank carrier to set each pair of bifurcations into substantial alinement with each other and parallel to the plane of the unslitted body portion.

7. In a machine of the class described, mechanism for setting the bifurcations of a bar like blank having bifurcated ends with the planes of the bifurcations transverse to the plane of the unslitted connecting portion of the blank comprising in combination a blank support on which the said connecting portion of the blank is held with the bifurcated ends of the blank extending at the opposite sides of the blank support and coöperating male and female dies arranged at each side of the blank support and movable relative to each other and to the blank support to give the outer portion of each bifurcation a quarter turn about its longitudinal axis.

8. In a machine of the class described, mechanism for setting the bifurcations of a bar like blank having bifurcated ends, with the planes of the bifurcations transverse to the plane of the unslitted connecting portion of the blank, comprising in combination a blank support in which the said connecting portion of the blank is held with the bifurcated ends of the blank extending at the opposite sides of the blank support and coöperating male and female dies arranged at each side of the blank support and movable relative to each other and to the blank support to enter the male die at each side of the carrier between the corresponding bifurcation and enter the said bifurcations and male die in said female die to set the bifurcations in planes parallel to each other and transverse to the plane of the unslitted portion.

9. In a machine of the kind described, the combination of a revoluble blank support formed with a work supporting seat adapted to support a bar like blank having bifurcated ends extending away from said seat and in combination therewith, means for turning said blank support step by step, dies for engaging and bending said bifurcations and means for rocking said dies about axes parallel to the side edges of said seat to set the bifurcations transverse to the plane of the seat.

10. In a machine for operating on a U shaped blank having a flat bar like unslitted yoke portion and having each of its legs split to form two fingers which lie in planes parallel to each other and transverse to the plane of said flat portion but parallel to the side edges of the latter, the combination of a plate like work support over the edge of which said blank is held, and slotted dies, one for each finger and each formed with a slot receiving the corresponding finger, and means for rotating said dies to cause the two fingers of each blank at each side of the work support to extend in opposite directions.

11. In a machine for operating on a U shaped blank having a flat bar like unslitted yoke portion and having each of its legs slit to form two fingers which lie in planes parallel to each other and transverse to the plane of said flat portion but parallel to the side edges of the latter, the combination of a plate like work support over the edge of which said blank is held, and slotted dies, one for each finger and each formed with a slot receiving the corresponding finger, means for rotating said dies to cause the two fingers of each blank at each side of the work support to extend in opposite directions, means for moving said dies toward and away from the work support at the beginning and at the end of each bending operation.

12. In a machine for the purpose specified, the combination of a work support having the form of a disk and revoluble step by step, means for bending a portion of a blank secured to said work support and projecting to one side thereof comprising a stationary die, a movable die and mechanism for moving the latter toward and away from the stationary die.

13. In a machine of the kind described, the combination of a rotating disk like support and means for removing therefrom articles mounted on and fitting over the peripheral edge thereof, comprising a stripper mounted to rotate about an axis parallel to the axis of the work support but external to the latter and comprising fingers sweeping along the opposite sides of the work support as the stripper is rotated.

14. In a machine for operating on a blank having a flat central portion and a pair of flat fingers projecting from each end thereof with the planes of the fingers transverse to the plane of said central portion, the combination of a revoluble work support having a seat against which said flat central portion of said blank may be clamped with the fingers of said blank projecting from the opposite sides thereof, means for turning said work support step by step, and a pair of bending dies one at each side of said work support and each formed with a pair of grooves for receiving the corresponding pair of fingers, and means for rocking said dies about axes parallel to the side edges of said seat in order to set said fingers perpendicular to said flat central portion.

NATHAN H. DAVIS.

Witnesses:
D. STEWART,
ARNOLD KATZ.

---

Copies of this patent may be obtained for five cents each, by addressing the "Commissioner of Patents, Washington, D. C."